UNITED STATES PATENT OFFICE.

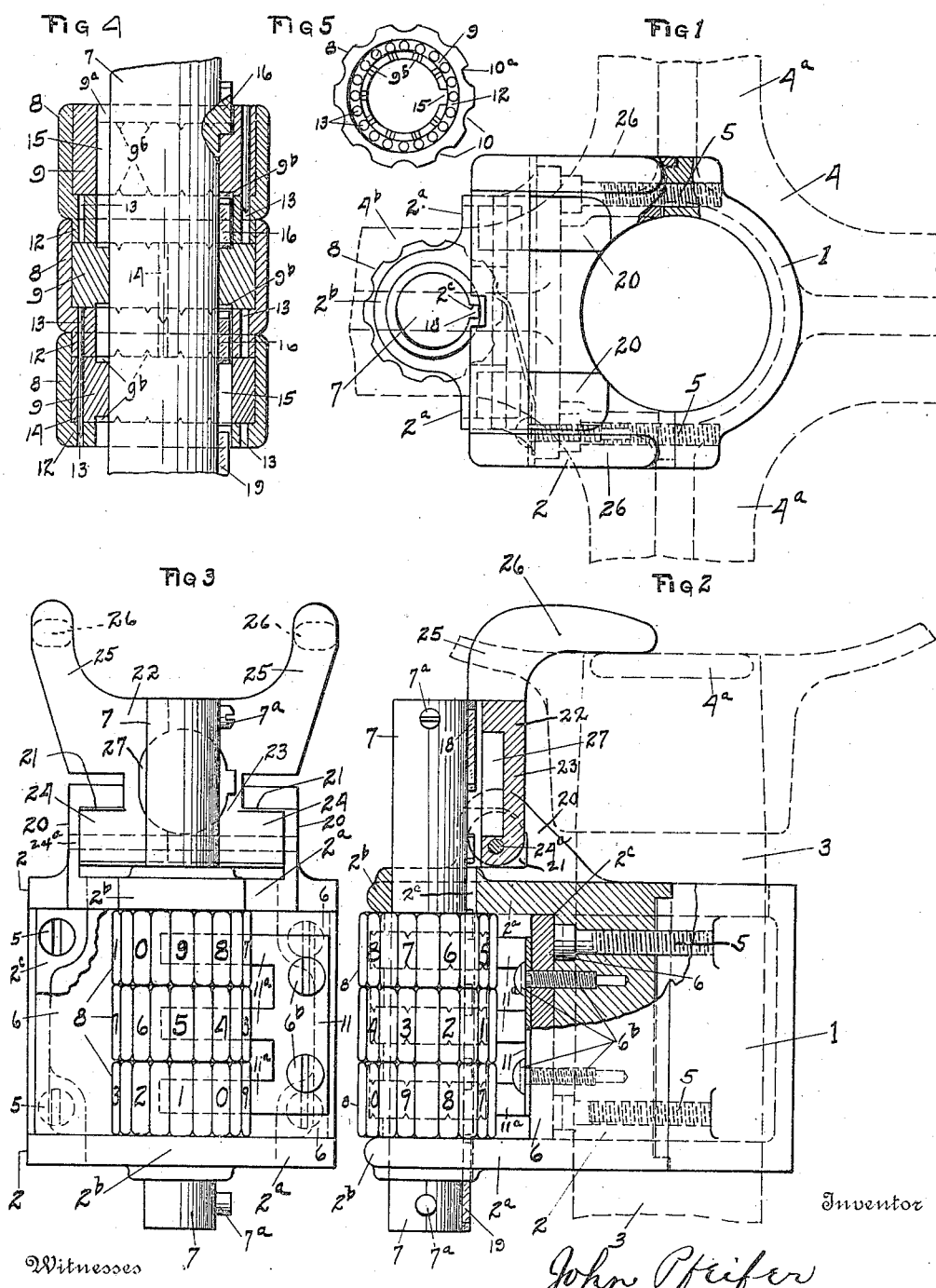

JOHN PFEIFER, OF SPRINGFIELD, OHIO, ASSIGNOR, BY DIRECT AND MESNE ASSIGNMENTS, TO THE SPRINGFIELD AUTO LOCK COMPANY, OF SPRINGFIELD, OHIO, A CORPORATION OF OHIO.

LOCK FOR STEERING-WHEELS FOR MOTOR-VEHICLES.

1,363,432.  Specification of Letters Patent.  Patented Dec. 28, 1920.

Application filed December 9, 1919. Serial No. 343,522.

*To all whom it may concern:*

Be it known that I, JOHN PFEIFER, a citizen of the United States, residing at Springfield, in the county of Clark and State of Ohio, have invented certain new and useful Improvements in Locks for Steering-Wheels for Motor-Vehicles, of which the following is a specification.

My invention relates to improvements in locking devices for the steering mechanism of automobiles, more particularly relating to a lock which may be applied to the steering post and arranged to lock the steering wheel.

An object of the invention is to provide a device of the character referred to which will not only lock the steering wheel against turning but will also prevent the removal of the wheel.

A further object of my invention is to simplify the construction and make more effective the operation of devices of this character.

In the accompanying drawings:—

Figure 1 is a top plan view of the lock showing a portion of the steering wheel in dotted lines.

Fig. 2 is a side view of the same partly broken away and shown in section.

Fig. 3 is a front view with a portion of the sealing plate broken away.

Fig. 4 is an enlarged sectional view of the permutation locking mechanism, with the upper and intermediate sleeves and rings thereof shown in locking positions and the lower sleeve and ring thereof in unlocking position.

Fig. 5 is a top plan of one of the members of the permutation locking mechanism.

Referring to the drawings, 1 and 2 represents two members of a clamp, semi-cylindrical in shape so as to conform to the contour of the steering post 3 of the steering wheel 4 of a motor vehicle; the meeting edges of the two clamping members being shouldered as indicated in Fig. 2 so as to overlap to form a protecting wall for the securing devices for the same to be described. The member 2 has forwardly-extending top and bottom flanges $2^a$ formed integrally therewith and these top and bottom flanges have centrally arranged integrally formed apertured ears $2^b$.

Extending through the walls of the clamping member 2 into the clamping member 1 are screws 5 which secure the two members of the clamp firmly together about the post. Placed over the front edges of the walls of the member 2 is a cover plate 6, this cover plate being seated upon a shoulder $2^c$ formed on the interior walls of the clamping member 2 so that the edges of the cover will be inclosed. Screws $6^b$ extending through the cover 6 into the walls of the member 2 hold the cover in position, but other means are also provided for preventing the removal of this cover and obtaining access to the screws 5 which will be hereinafter explained in connection with the permutation locking mechanism.

A locking bolt 7 is slidably mounted in the apertured ears $2^b$. About this bolt and between the ears are locking devices for the same. These locking devices consist of a series of outer sleeves 8, three in number in the present case, each provided with an inner ring 9. Each sleeve 8 is provided with equally spaced indicating characters from 0 to 9 as shown and between each indication is a vertical groove 10, these rounded grooves coöperating with spring fingers $11^a$ on the plate 11 which is held in position on the cover 6 by the screws $6^b$ previously referred to; the spring fingers $11^a$ having their outer ends bent at a slight angle so as to wipe over the respective sleeves 8 and coöperate with the grooves to act as clickers. One of the grooves 10 is provided with a straight face at one side thereof as indicated at $10^a$ in Fig. 10 so as to coöperate with the extreme ends of the clicker arms and act as stops for the sleeves so that the sleeves may be turned back and stopped at zero for the purpose of finding the combination by observing the number of clicks.

Each sleeve 8 has an integrally-formed inner flange 12 at its lower end provided with a series of equally spaced vertical openings 13, in the present case twenty of these openings being provided. In the two upper sleeves this flange projects below the lower edge thereof, so as to telescope with the under sleeve. Each of the rings 9 is fitted to the interior of its corresponding sleeve 8, resting upon the flange 12. In the upper sleeve 8 this ring may be of a length equal to the distance between the upper end of the sleeve 8 and its flange 12, but in the intermediate and lower sleeves the ring is shorter so as to accommodate the flange of the sleeve immediately above it. Each ring 9 has a downwardly-extending pin 14 so positioned that when the ring is inserted in its sleeve the pin will be caused to enter any one of the openings 13 so as to hold the ring in fixed relation with the sleeve so far as revoluble movement is concerned. Each ring 9 also has diametrically opposite the pin, a vertically-extending interior slot 15. The extreme upper portion of the upper ring is formed with an enlarged bore as indicated at $9^a$ so that the upper edge thereof may stand flush with the upper edge of its sleeve 8 so that when the sleeves and rings are in assembled position between the ears $2^b$, they will be held against any vertical displacement; this construction leaving the grooved portion of said upper ring of the same size as that of the two other rings for a purpose to be explained.

The locking bolt 7 is provided with a series of alined projections 16, in the present case 5 in number, and also at the upper and lower ends with ribs 18 and 19 in alinement with the projections, the ends of the projections and ribs being beveled as shown. Each of the ears $2^b$ has a vertical slot $2^c$ cut in the inner bore of the aperture therethrough, these grooves being alined and in the present case being centered on the transverse axes of the apertures. The distance between the respective ribs and the adjacent projections and also between the projections is equal to or slightly greater than the width of the intermediate and lower rings and of the grooved portion of the upper ring. When the parts are in assembled position and the grooves 15 are in alinement with each other, and also with the ribs and projections on the bolt, the bolt may be moved vertically to or from locking position; the bolt being projected in front of the locking device to be hereinafter described. To lock the bolt the sleeves 8 are turned to bring the solid portions of the rings in alinement with the projections on the bolt and to unlock the bolt it is then necessary to turn the sleeves back to the proper point to again aline the grooves in the rings with each other and with the projections and ribs, the point to which these sleeves are turned being determined by the combination. It should be explained that the bolt 7 is provided at each end with a stop $7^a$, one or both of which may be removable and that when the bolt is at its extreme upper or lower position, as determined by these stops, the intermediate and lower rings and the grooved portion of the upper ring will be in alinement with the spaces between the projections and ribs of the bolt so that the sleeves and their rings may be turned about the bolt for the purpose of locking or unlocking the same. In addition to the groove 15 in each of the rings, each ring is also provided with a series of equally spaced shallow recesses $9^b$ on both its upper and lower edges, nine in number, which, together with the groove 15, correspond to the indications on its corresponding sleeve 8. These notches or recesses $9^b$ are for the purpose of "foolers" to prevent the finding of the groove 15 by the slight up and down movement allowed by the bolt when in locked position.

In order to set the combination, assuming that the combination is 9 5 1, as shown in Fig. 3, the pin on the upper ring will have been placed in the opening 13 opposite the indication 9 of the sleeve, the pin on the intermediate ring will have been placed in the opening 13 opposite the indication 5 of its sleeve and the pin on the lower ring will have been placed in the opening opposite the indication 1 of its sleeve. By then turning all the sleeves so as to read 9 5 1 downwardly, all the grooves will be alined with each other and also with the projections and ribs on the bolt, thus unlocking the bolt. The combination can be changed at any time by removing the sleeves and changing the position of the rings with respect thereto. If desired the pins of the rings may be placed in an opening intermediate any two indications on the sleeves so that half numbers may be secured in the combination, and that is the reason why twenty of the openings 13 are provided.

Projecting upwardly from the clamping member 2 are a pair of ears 20 having recesses 21 open at the front end closed at the top and rear sides thereof. Pivoted to the ears 20 is a latch plate 22, the plate having a centrally-arranged tongue 23 which lies between the overhanging portions of the ears 20 and terminates in two oppositely extending trunnions 24 which extends within the recesses 21 as shown best in Fig. 3; a pintle $24^a$ extending through the ears and trunnions forming the pivotal connection. The outer edge of the latch plate 20 has at each side thereof a projecting finger 25, the outer ends of which are bent at substantially right angles as indicated at 26 to form prongs. These bent fingers or prongs are so positioned that when the latch plate is swung to the locking position as indicated in the drawings the portions 26 of the fingers will overlie two oppositely arranged spokes, for instance the spokes $4^a$, of the steering wheel, while the finger 25 will straddle another spoke, as the spoke $4^b$, of the steering wheel. After the latch plate has been swung to this locking position, the locking bolt 7 is moved up in front of the plate and locked by the permutation locking devices so as to lock the latch plate. In unlocking the wheel, the locking bolt 7 will be dropped to its lowermost position, after which the latch plate can be swung forwardly so as to clear the spokes of the wheel, the latch plate having its forward side preferably formed with a recess 27 to accommodate the upper end of the locking bolt when the latch is swung to unlatching position.

By this construction it will be seen that the steering wheel is not only locked against turning but also against removal.

Having thus described my invention, I claim:—

1. In a lock of the character described, a support arranged in proximity to the steering wheel of a motor vehicle, a latch pivoted to said support and having surfaces to engage the top sides of portions of said wheel, a bolt slidably mounted on said support so as to be projected along the outer side of said latch when in locking position, and locking mechanism for said bolt.

2. In a lock of the character described, a support arranged in proximity to the steering wheel of a motor vehicle, a latch pivoted to said support and having surfaces to engage the top sides of portions of said wheel, a pair of forwardly-projecting ears on said support, a bolt slidably mounted in said ears and arranged to be projected upwardly along the outer side of said latch when in locking position, and locking mechanism arranged about said bolt between said ears.

3. In a lock of the character described, a support arranged in proximity to the steering wheel of a motor vehicle, a latch pivoted to said support and having surfaces to engage the top sides of portions of said wheel, a pair of forwardly-projecting ears on said support, a bolt slidably mounted in said ears and arranged to be projected upwardly along the outer side of said latch when in locking position, and permutation locking mechanism having manually rotatable elements arranged about said bolt between said ears.

4. In a lock of the character described, a support, upwardly projecting ears on said support, each of said ears having a recess on its inner side open at the front, a latch having trunnions projected into said recesses and hinged to said ears, and a locking member carried by said support arranged to be projected along the outer side of said latch to lock the same against swinging movement on its hinge and to also prevent the removal of its trunnions from said recesses.

In testimony whereof I have hereunto set my hand this 3rd day of December 1919.

JOHN PFEIFER.

Witness:
 CHAS. I. WELCH.